(12) United States Patent
Kulik et al.

(10) Patent No.: US 10,999,507 B2
(45) Date of Patent: May 4, 2021

(54) OPTICAL IMAGE STABILIZATION TECHNIQUES

(71) Applicant: QUALCOMM Incorporated, San Diego, CA (US)

(72) Inventors: Victor Kulik, San Jose, CA (US); Mehul Soman, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/175,688

(22) Filed: Oct. 30, 2018

(65) Prior Publication Data
US 2020/0137308 A1    Apr. 30, 2020

(51) Int. Cl.
*H04N 5/232* (2006.01)
*H04N 5/04* (2006.01)

(52) U.S. Cl.
CPC ..... *H04N 5/23287* (2013.01); *H04N 5/23258* (2013.01); *H04N 5/04* (2013.01); *H04N 5/2329* (2013.01); *H04N 5/232411* (2018.08)

(58) Field of Classification Search
CPC ........... H04N 5/23287; H04N 5/23258; H04N 5/232411; H04N 5/2329; H04N 5/04
See application file for complete search history.

(56) References Cited

U.S. PATENT DOCUMENTS

| 5,903,783 | A | 5/1999 | Kanbayashi et al. |
| 5,930,531 | A | 7/1999 | Kitagawa et al. |
| 2015/0365568 | A1 | 12/2015 | Topliss et al. |
| 2016/0127646 | A1 | 5/2016 | Osborne |
| 2016/0360111 | A1 | 12/2016 | Thivent et al. |
| 2017/0272656 | A1* | 9/2017 | Kurata ............... H04N 5/23267 |
| 2018/0295301 | A1* | 10/2018 | Lee ...................... H04N 5/3454 |
| 2019/0281221 | A1* | 9/2019 | Kuwahara ............. H04N 5/232 |
| 2020/0137309 | A1 | 4/2020 | Kulik et al. |

FOREIGN PATENT DOCUMENTS

| EP | 1884817 A2 | 2/2008 | |
| EP | 3220624 A1 | 9/2017 | |
| WO | WO-2018025659 A1 * | 2/2018 | ......... H04N 5/23287 |
| WO | WO2018025659 A1 | 2/2018 | |

OTHER PUBLICATIONS

U.S. Appl. No. 16/107,622, filed Aug. 21, 2018, Soman et al.
International Search Report and Written Opinion—PCT/US2019/057643—ISA/EPO—dated Dec. 20, 2019.

* cited by examiner

*Primary Examiner* — Yogesh K Aggarwal
(74) *Attorney, Agent, or Firm* — Weaver Austin Villeneuve & Sampson LLP

(57) ABSTRACT

An optical image stabilization (OIS) of a camera system includes a controller, a lens and an image stabilizing arrangement (ISA), including one or both of an actuator and an image sensor. The controller is receives measured camera motion information from at least one motion sensor. Prior to acquisition of a succession of image frames, the controller determines a first desired start position, for the camera lens and/or the image sensor and, during acquisition of each respective image frame in the succession of image frames, causes the ISA to shift the camera lens and/or the image sensor so as to compensate for the measured camera motion. During a time interval that falls at least partially between a first and a second successive frame, the controller causes the ISA to relocate the camera lens and/or image sensor to a second desired start position for the second successive frame.

27 Claims, 13 Drawing Sheets

OPTICAL IMAGE STABILIZATION TECHNIQUES

CROSS-REFERENCE TO RELATED APPLICATIONS

The present application is related to co-pending U.S. patent application Ser. No. 16/175,692, filed concurrently herewith, entitled "OPTICAL IMAGE STABILIZATION TECHNIQUES," assigned to the assignee hereof and incorporated by reference in its entirety into the present application.

TECHNICAL FIELD

This disclosure relates to techniques for optical image stabilization (OIS), and more particularly to improving OIS performance of a camera system by reducing instances of a stabilization platform thereof reaching a range of motion limit, reducing power required and/or adjusting auto exposure parameters to account for OIS performance.

DESCRIPTION OF THE RELATED TECHNOLOGY

Optical Image Stability (OIS) techniques improve the performance of camera systems by counteracting image blur due to camera unsteadiness or jitter and/or to compensate for rolling shutter distortions during image capture. This may be particularly important for cameras implemented in handheld devices such as mobile phones and tablet computing devices for still or video images. As contemplated in this disclosure, OIS techniques may include operating one or more actuators coupled with a camera lens and/or a sensor that translate, tilt and/or rotate the lens and/or sensor relative to the camera system in at least one of the pitch, roll, and yaw directions.

An OIS arrangement may largely or completely compensate for effects of camera motion, including rotation (that may be measured gyroscopically, for example) and translation (that may be measured by an accelerometer, for example) and/or rolling shutter effects. Capability of the OIS arrangement to compensate for these effects may be compromised when camera motion exceeds a range of motion limit of the actuators. In addition, conventional OIS arrangements a significant amount of power.

Thus, improved motions improved OIS techniques are desirable.

SUMMARY

The systems, methods and devices of this disclosure each have several innovative aspects, no single one of which is solely responsible for the desirable attributes disclosed herein.

One innovative aspect of the subject matter described in this disclosure relates to an apparatus for optical image stabilization (OIS) of a camera system. The apparatus includes a lens of the camera system, an image stabilizing arrangement, the arrangement including one or both of an image sensor optically coupled with the camera lens and an actuator mechanically coupled with the one or both of the lens and the image sensor; and a controller. The controller is communicatively coupled with the image stabilizing arrangement and at least one motion sensor for measuring camera motion. The controller is configured to: receive measured camera motion information from the at least one motion sensor; prior to acquisition of a succession of image frames, determine a first desired start position, for one or both of the camera lens and the image sensor; during acquisition of each respective image frame in the succession of image frames, cause the image stabilizing arrangement to shift or rotate one or both of the camera lens and the image sensor so as to compensate for the measured camera motion; and during a time interval that falls at least partially between a first successive frame and a second successive frame, relocate one or both of the camera lens and the image sensor to a second desired start position for the second successive frame.

In some examples, the controller may be configured to synchronously relocate, during at least a portion of the time interval, one or both of the camera lens and the image sensor by controlling a slew motion of the camera lens or image sensor.

In some examples, the controller may be configured to select at least one of the first and second respective desired start position so as to reduce one or both of (i) likelihood of railing and (ii) power consumption.

In some examples, the respective desired start position may be proximate to a geometrically neutral position.

In some examples, the second desired start position may be disposed, with respect to a geometrically neutral position and with respect to an end position reached at completion of an immediately preceding frame, such that the geometrically neutral position is approximately midway between the second desired start position and the end position.

In some examples, the time interval may fall entirely between the first successive frame and the second successive frame.

In some examples, the time interval may at least partially overlaps one or both of the first successive frame and the second successive frame.

In some examples, the camera motion information may include one or both of rotation and translation.

In some examples, the controller may be configured to drive the actuator to relocate the lens.

In some examples, the motion sensor may include one or more of a gyroscope, an accelerometer or other motion sensor.

In some examples, the controller may be configured to monitor and control one or more of exposure time, effective readout time, lens/sensor relocation time and frame period. In some examples, the controller may be configured to control one or more of the exposure time, the effective readout time, the lens/sensor relocation time and the frame period so as to cause the sum of the exposure time, the effective readout time and the lens/sensor relocation time to be less than the frame period.

According to some implementations, a method for optical image stabilization (OIS) of a camera system includes: receiving, at a controller, measured camera motion information from at least one motion sensor; during acquisition of a succession of image frames, determining, with the controller, a respective desired start position, for one or both of a camera lens and an image sensor, for a respective image frame; during acquisition of the respective image frame, causing the image stabilizing arrangement to shift, under direction of the controller, one or both of the camera lens and the image sensor so as to compensate for the measured camera motion; and during a time interval that falls at least partially between a first successive frame and a second successive frame, relocating, under direction of the controller, one or both of the camera lens and the image sensor to a respective desired start position for the second successive frame.

In some examples, the method may further include synchronously relocating, under direction of the controller, during at least a portion of the time interval, one or both of the camera lens and the image sensor by controlling a slew motion of the camera lens or image sensor.

In some examples, the method may further include selecting, with the controller, the respective desired start position so as to reduce one or both of (i) likelihood of railing and (ii) power consumption.

In some examples, the respective desired start position may be proximate to a geometrically neutral position.

In some examples, the respective desired start position may be disposed, with respect to a geometrically neutral position and with respect to an end position reached at completion of an immediately preceding frame, such that the geometrically neutral position is approximately midway between the start position and the end position.

In some examples, the time interval may fall entirely between the first successive frame and the second successive frame.

In some examples, the time interval may at least partially overlap one or both of the first successive frame and the second successive frame.

In some examples, the camera motion information may include one or both of rotation and translation.

In some examples, relocating the camera lens may include driving an actuator with the controller.

Ins some examples, the method may further include monitoring and controlling, with the controller, one or more of exposure time, effective readout time, lens/sensor relocation time and frame period.

In some examples, controlling one or more of the exposure time, the effective readout time, the lens/sensor relocation time and the frame period may include causing the sum of the exposure time, the effective readout time and the lens/sensor relocation time to be less than the frame period.

According to some implementations, in a non-transitory computer readable medium storing program code to be executed by a controller, the program code includes instructions configured to cause the controller to: receive measured camera motion information from at least one motion sensor; during acquisition of a succession of image frames, determine a respective desired start position, for one or both of a camera lens and an image sensor, for a respective image frame; during acquisition of the respective image frame, cause the image stabilizing arrangement to shift one or both of the camera lens and the image sensor so as to compensate for the measured camera motion; and during a time interval that falls at least partially between a first successive frame and a second successive frame, cause the image stabilizing arrangement to relocate one or both of the camera lens and the image sensor to a respective desired start position for the second successive frame.

In some examples, the computer readable medium may further include instructions configured to cause the controller, during at least a portion of the time interval, to synchronously relocate one or both of the camera lens and the image sensor by controlling a slew motion of the camera lens or image sensor.

In some examples, the computer readable medium may further include instructions configured to cause the controller to select the respective desired start position so as to reduce one or both of (i) likelihood of railing and (ii) power consumption.

In some examples, the computer readable medium may further include instructions configured to cause the controller to monitor and control one or more of exposure time, effective readout time, lens/sensor relocation time and frame period.

In some examples, controlling one or more of the exposure time, the effective readout time, the lens/sensor relocation time and the frame period may include causing the sum of the exposure time, the effective readout time and the lens/sensor relocation time to be less than the frame period.

According to some implementations, an apparatus for optical image stabilization (OIS) of a camera system includes a lens of the camera system; an image stabilizing arrangement, including one or both of: an image sensor optically coupled with the camera lens, means for shifting or rotating one or both of the lens and the image sensor; and a controller, the controller communicatively coupled with the image stabilizing arrangement and at least one motion sensor for measuring camera motion. The controller is configured to: receive measured camera motion information from the at least one motion sensor; prior to acquisition of a succession of image frames, determine a first desired start position, for one or both of the camera lens and the image sensor; during acquisition of each respective image frame in the succession of image frames, cause the image stabilizing arrangement to shift or rotate one or both of the camera lens and the image sensor so as to compensate for the measured camera motion; and, during a time interval that falls at least partially between a first successive frame and a second successive frame, relocate one or both of the camera lens and the image sensor to a second desired start position for the second successive frame.

In some examples, the controller may be configured to synchronously relocate, during at least a portion of the time interval, one or both of the camera lens and the image sensor by controlling a slew motion of the camera lens or image sensor.

In some examples, the controller may be configured to select at least one of the first and second respective desired start position so as to reduce one or both of (i) likelihood of railing and (ii) power consumption.

In some examples, the respective desired start position may proximate to a geometrically neutral position.

In some examples, the second desired start position may be disposed, with respect to a geometrically neutral position and with respect to an end position reached at completion of an immediately preceding frame, such that the geometrically neutral position is approximately midway between the second desired start position and the end position.

In some examples, the time interval may fall entirely between the first successive frame and the second successive frame.

In some examples, the time interval may at least partially overlaps one or both of the first successive frame and the second successive frame.

In some examples, the controller may be configured to monitor and control one or more of exposure time, effective readout time, lens/sensor relocation time and frame period so as to cause the sum of the exposure time, the effective readout time and the lens/sensor relocation time to be less than the frame period.

BRIEF DESCRIPTION OF THE DRAWINGS

Details of one or more implementations of the subject matter described in this specification are set forth in this disclosure and the accompanying drawings. Other features, aspects, and advantages will become apparent from a review of the disclosure. Note that the relative dimensions of the drawings and other diagrams of this disclosure may not be drawn to scale. The sizes, thicknesses, arrangements, materials, etc., shown and described in this disclosure are made only by way of example and should not be construed as limiting. Like reference numbers and designations in the various drawings indicate like elements.

DETAILED DESCRIPTION

The following description is directed to certain implementations for the purposes of describing the innovative aspects of this disclosure. However, a person having ordinary skill in the art will readily recognize that the teachings herein may be applied in a multitude of different ways. The described implementations may be implemented in any device, apparatus, or system that includes a millimeter band communications capability. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headbands and patches, etc., Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), mobile health devices, computer monitors, auto displays (including odometer and speedometer displays, etc.), cockpit controls and/or displays, steering wheels, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, automated teller machines (ATMs), parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also may be used in applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

Figure 1:
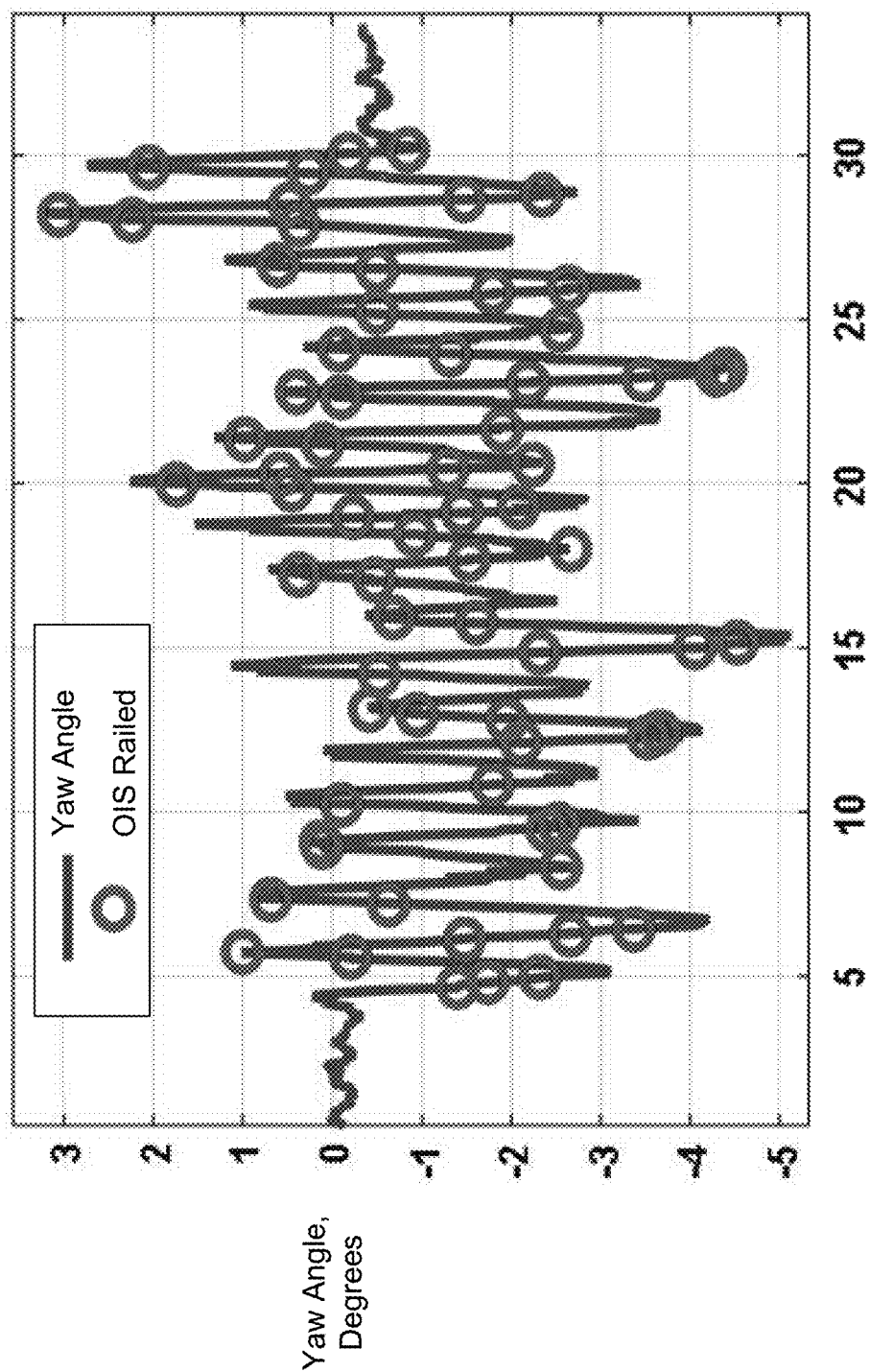
FIG. 1 illustrates an example of a railing phenomenon resulting from a walking motion.

The systems, methods and devices of the disclosure each have several innovative aspects, no single one of which is solely responsible for the desirable attributes disclosed herein. The subject matter described in this disclosure can be implemented in connection with synchronous optical image stabilization (OIS) system that includes operating one or more actuators coupled with a camera lens and/or a sensor. The actuators may tilt and/or rotate the lens and/or sensor relative to the camera system in at least one of the pitch, roll, and yaw directions. The actuators are subject to mechanical range of motion limits. Camera motion, including one or both of rotation and translation, in the absence of the presently disclosed techniques, may drive one or more of the actuators to a range of motion limit (i.e., cause the actuator to "rail"). In an event of actuator "railing", undesirable image distortions arise. In the absence of the presently disclosed techniques, an actuator, that may typically be a voice coil motor (VCM) actuator having a range of motion of +/−1-2 degrees, may experience frequent railing, particularly when the camera is continuous still shot preview mode or video and particularly in use cases that include camera panning or user motion, due to walking or running, using the camera in a moving and/or vibrating vehicle. FIG. 1 illustrates an example of a railing phenomenon resulting from a walking motion, for an actuator having a range of motion of +/−1°. It may be observed that the OIS enters a railed state a large number of times (more than once per second) during the 30 second modeled period.

The presently disclosed techniques substantially reduce the frequency and number of instances in which railing occurs for many use case scenarios, while also reducing power consumption of the OIS arrangement. In some implementations, this is accomplished by synchronizing actuator motion with exposure duration of an image data acquisition frame. In some implementations, camera motion is compensated during the exposure duration of a given (first) frame, and, during an interval between termination of the first frame and initiation of a subsequent (second) frame, the actuator is moved back to a new starting position. Advantageously, the new starting position may be selected with an objective of reducing likelihood that railing will occur during the duration of the subsequent frame and/or to reduce power. Because, for at least a VCM actuator, power consumption increases as a function of actuator excursion away from a neutral (centered) position, the present techniques can reduce power consumption by maintaining the actuator, on average, closer to the neutral position.

Figure 2:
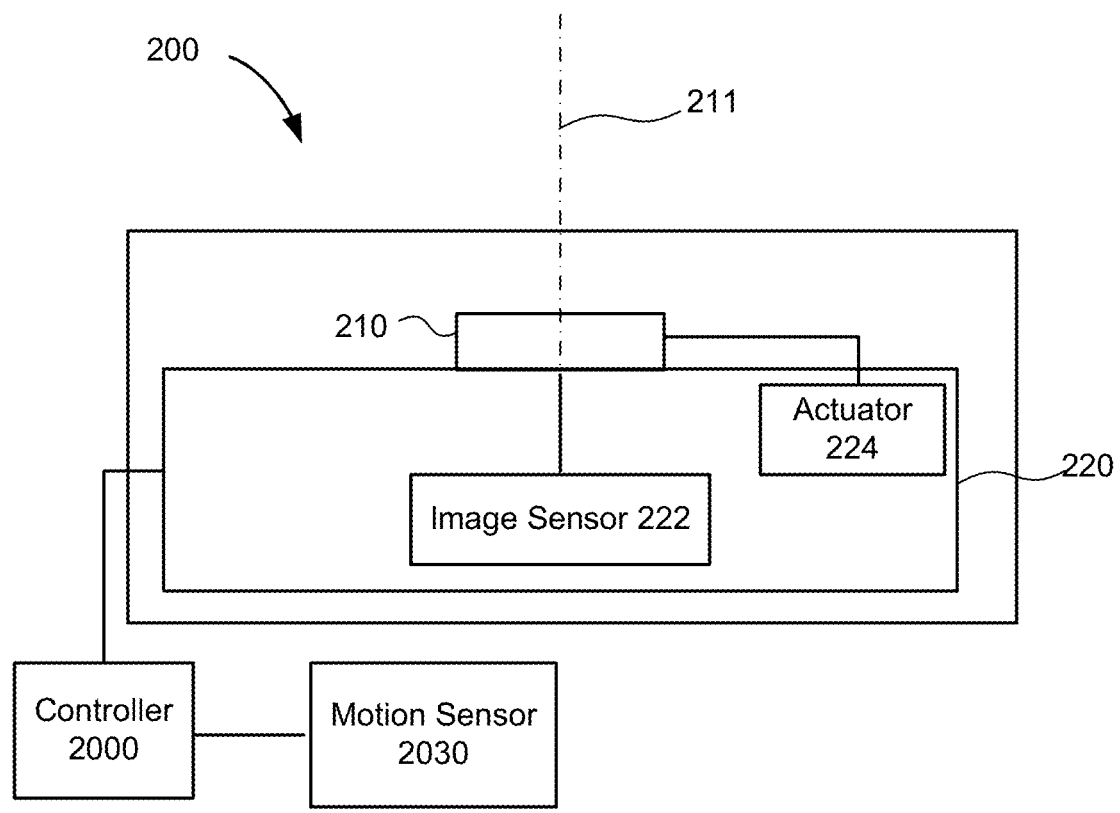
FIG. 2 illustrates an example of an apparatus for synchronous optical image stabilization (OIS) of a camera system, according to an implementation.

FIG. 2 illustrates an example of an apparatus for synchronous optical image stabilization (OIS) of a camera system, according to an implementation. In the illustrated implementation, a camera system 200 the apparatus includes a lens 210 and an image stabilizing arrangement (ISA) 220. The ISA 220 may include an image sensor 222 optically coupled with the lens 210 and an actuator 224 mechanically coupled with the lens 210 and/or the sensor 222. The actuator 224, which in some implementations may be a voice coil motor (VCM) actuator, may be configured to rotate the lens 210 about one or more axes (pitch and/or yaw axes) orthogonal to an optical axis 211.

The apparatus further includes a controller 2000, communicatively coupled with the ISA 220 and at least one motion sensor 2030 for measuring camera motion. The motion sensor 2030 may be or include a gyroscope, an accelerometer, and/or any other type of motion sensor. In some implementations, during acquisition of a succession of image frames, the controller 2000 may be configured to determine, based on considerations described hereinbelow, a respective desired start position, for one or both of the of the camera lens 210 and the image sensor 222 for each respective frame. The controller 2000 may further be configured to control the ISA 220 such that, during acquisition of each image frame, the ISA 220 shifts one or both of the lens 210 and the image sensor 222 so as to compensate for the camera motion sensed by motion sensor 2030. In addition the controller 2000 may be configured to cause the ISA 220 to relocate, between a first successive frame and a second successive frame, one or both of the lens 210 and the motion sensor 2020 to the determined respective desired start position for the second successive frame.

Figure 3:
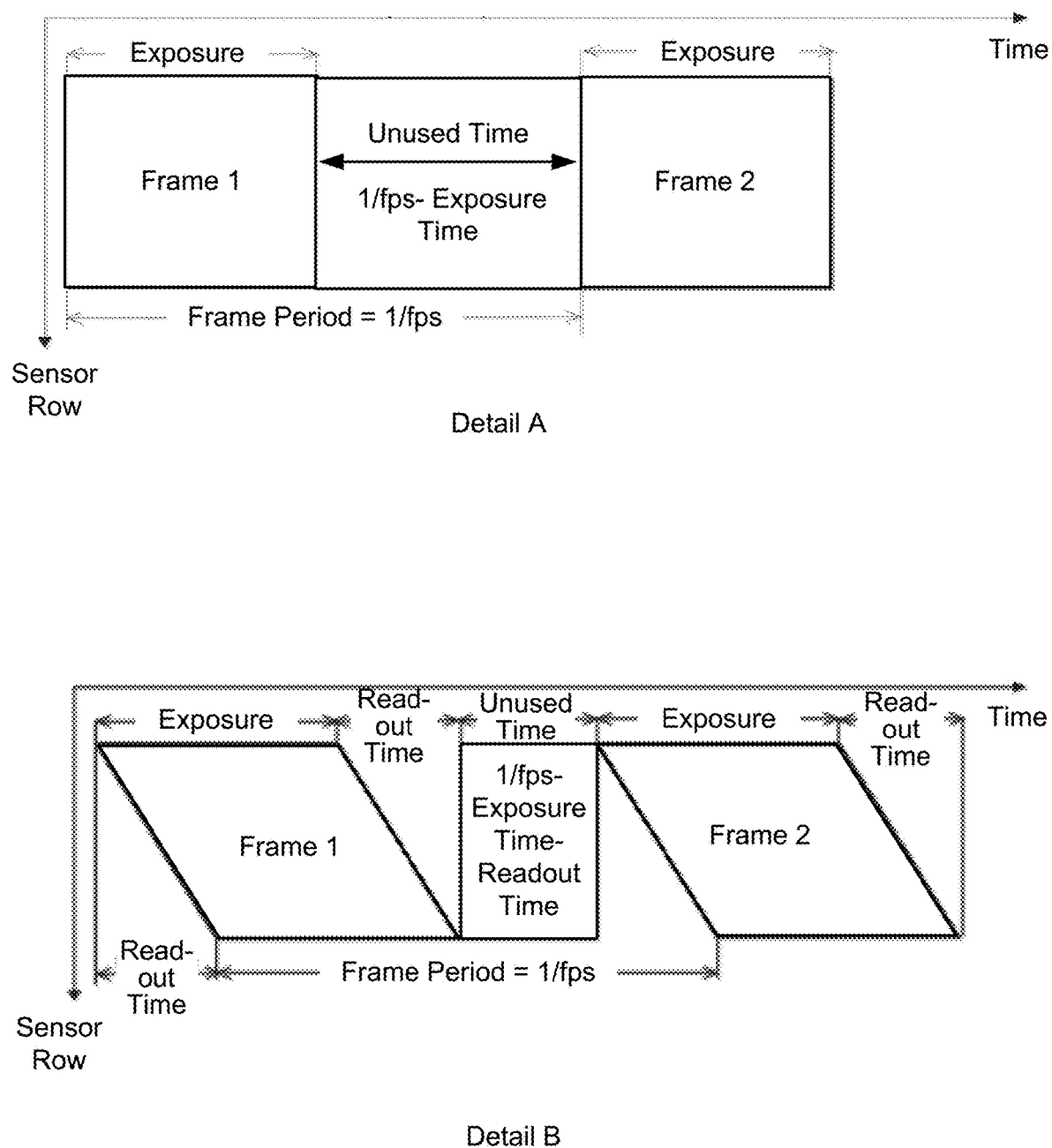
FIG. 3 illustrates synchronous OIS operation as a function of time, according to some implementations.

FIG. 3 illustrates synchronous OIS operation as a function of time, according to some implementations. Referring first to Detail A, for a "global shutter" operating mode, a camera acquiring successive frames of image data may operate at a frame rate of 'n' frames per second (fps), each frame requiring an exposure time of 't' seconds. It will be appreciated that, where 't' is less than 1/'n', an interval will exist between each two successive frames during which image acquisition is not taking place. For example, if n=30 and t'=15 msecs, an interval of about 18 msecs (1000/30−15 msecs) will be "unused time", that is, time during which image data is not acquired, also referred to as "blackout" time. During an 'exposure' period of Frame 1, the controller 2000 may be configured to control actuator 224 and/or the image sensor 222 to cause the lens or sensor to compensate for motion registered by motion sensor 2030. During the "unused time" between acquiring frame 1 and frame 2, the controller 2000 may be configured to cause the actuator 224 and/or the image sensor 222, to transition to a desired start position. Advantageously, the desired start position is determined by the controller so as to meet one or a combination of the following objectives: (1) reducing the likelihood that, in frame 2, the actuator 224 or the image sensor 222 will be driven to a range of motion limit; and (2) reducing power consumption. The second objective may be met, in some implementations, by returning the actuator 224 to or near a "neutral" position, as will be described in more detail hereinbelow.

Advantageously, the disclosed techniques permit a constraint, for effective image stabilization, that camera motion never exceeds an actuator range of motion to be replaced with a much weaker constraint that camera motion not exceed the actuator range during a single frame exposure period.

Referring now to Detail B of FIG. 3 for a "rolling shutter" operating mode, where a camera acquiring successive frames of image data operates at a frame rate of 'n' frames per second (fps), the duration of each frame is the sum of an exposure time and "read-out time". It will be appreciated that, where the frame duration plus read-out time is less than 1/'n' an interval will exist between each two successive frames during which image acquisition is not taking place, as described hereinabove. During the "unused time" between acquiring frame 1 and frame 2, the controller 2000 may be configured to cause the actuator 224 and/or the image sensor 222, to transition to a desired start position. As indicated above, the desired start position may be determined by the controller so as to reduce the likelihood that, in frame 2, the actuator 224 or the image sensor 222 will be driven to a range of motion limit; and/or to reduce power consumption.

Figure 4:
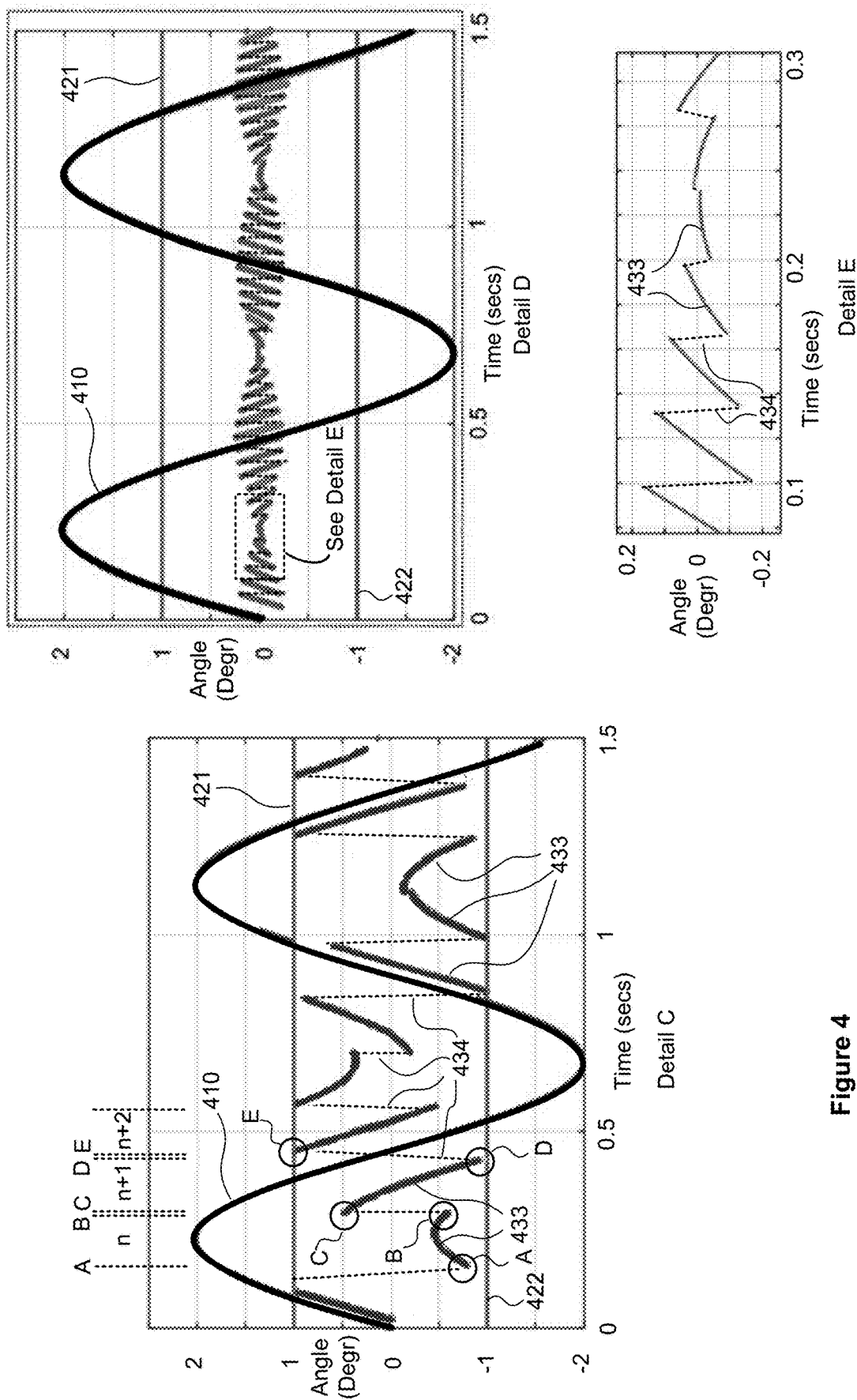
FIG. 4 illustrates examples of modelled OIS operation as a function of time, according to some implementations.

FIG. 4 illustrates examples of modelled OIS operation as a function of time, according to some implementations. Referring first to Detail C, plot 410 shows a simplified example of a modeled or simulated motion of a camera with respect to time. Limit lines 421 and 422 denote, respectively, an upper and lower range of motion limit assumed for the camera's OIS actuator and/or sensor. In the example simulation, image data is acquired at 5 fps, with a short (<10 ms) "unused time" between successive frames. Line segments 433 represent motion of the lens or sensor as a function of time during each of a succession of frames. Line segments 434 (dashed) represent motion of the lens or sensor as a function of time during intervals between a succession of frames. During the unused time between two successive frames, the lens or image sensor may be quickly slewed to a to desired start position for the succeeding frame. In the illustrated example, the OIS operation may result in motion of the lens or sensor from point 'A' to point 'B' during frame 'n' so as to compensate for camera motion. Following termination of frame 'n' and prior to initiation of frame n+1, the lens or sensor may be slewed from point B to point C. Point C may be selected with an objective of avoiding railing during frame n+1 and/or to reduce OIS power consumption. The OIS operation may then result in motion of the lens or sensor from point 'C' to point 'D' during an frame n+1 so as to compensate for camera motion, followed by a slew from point 'D' to point 'E'.

In some implementations the desired start point and/or the magnitude and direction of the slew motion may be determined as a function of measured camera angular rate, a, and frame duration. For example, the angular motion slew motion may be calculated according to the formula: −α*frame duration/2. Such an approach will tend to result in slew motion that is motion symmetrical with respect to a neutral position and maximizes the lens/sensor motion reserve on both sides and works well when the camera motion is slow or periodic predictable motion (panning, walking).

Alternatively, where the motion is random, slew motion may be set so as to return the lens/sensor to the neutral position before each new frame Details D and E illustrate a similar OIS operation technique as Detail C, for a higher frame rate (30 fps) with a few msecs unused time between each frame. It may be observed that, for the illustrated simulation, the lens/sensor is always within less than 0.25 degrees from neutral (i.e., exhibits ample margin with respect to the rail limits) notwithstanding that camera angle varies from −2 to 2 degrees.

Although for simplicity of illustration, FIG. 4 depicts angular position as a function of time for the camera (plot 410) and the lens/sensor (line segments 433 and 434), with respect to a single axis it will be appreciated that camera motion may be angular (typically measured gyroscopically) or linear (typically measured by an accelerometer or other motion sensor) with respect to two or more axes. Moreover, regardless of the nature of the camera motion, compensating motion of the lens/sensor may be linear and/or angular with respect to two or more axes.

Figure 5:
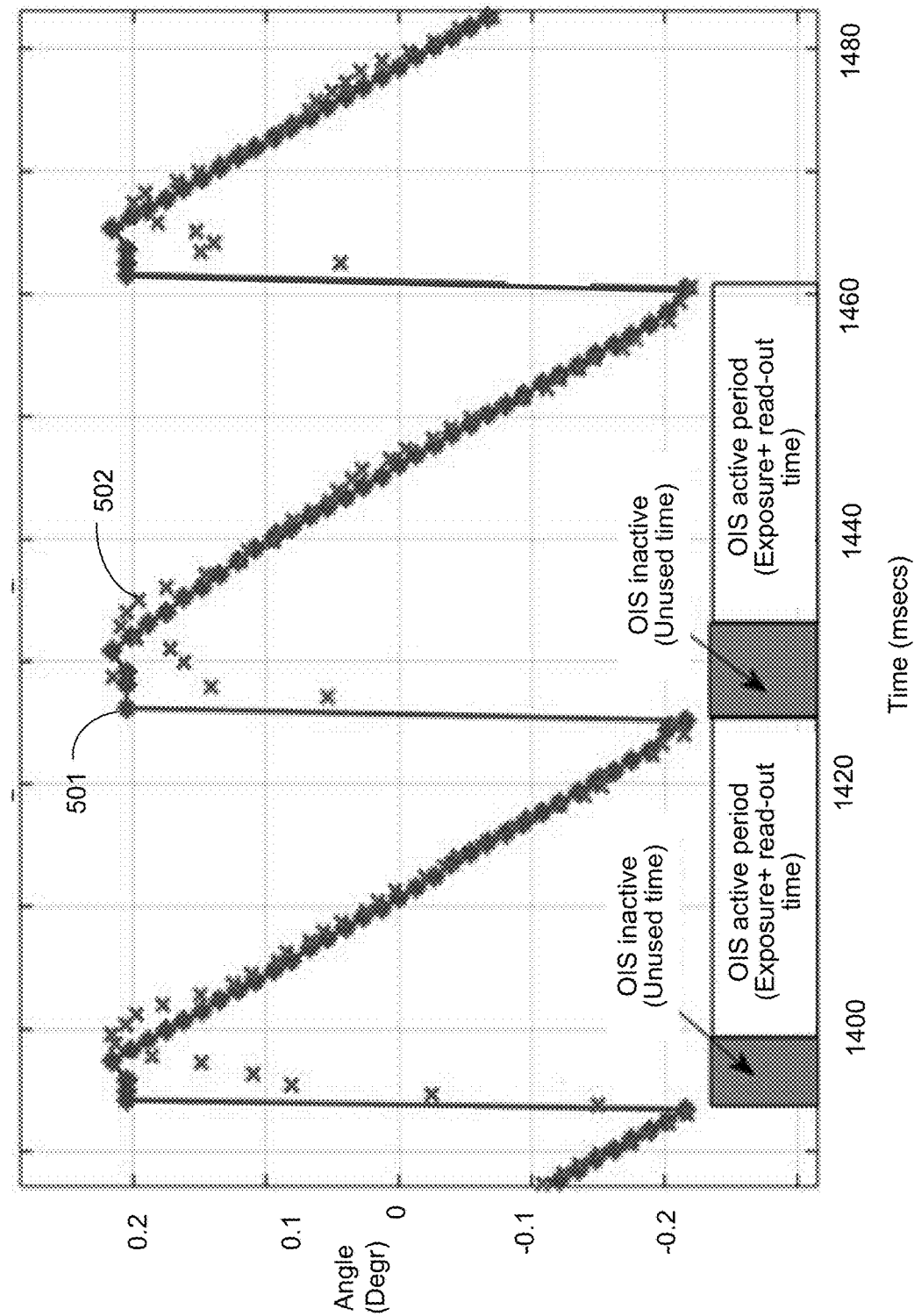
FIG. 5 illustrates another example of modelled OIS operation as a function of time, according to some implementations.

FIG. 5 illustrates another example of modelled OIS operation as a function of time, according to some implementations. In the illustrated example, a simulation of video operation at 30 fps with a 5 ms "unused time" between each frame is depicted on an expanded time scale, it may be observed that during each successive "unused time" interval, the lens/sensor is slewed about 0.4 degrees, with a maximum excursion from the neutral (0 degree angle) of about 0.2 and −0.2 degrees. Plots 501 and 502 depict, respectively, an OIS controller angle input and an actual angular position (determined from linear displacements measured with a Hall sensor).

As indicated hereinabove, OIS power consumption substantially depends on the lens/sensor distance from neutral position particularly for a VCM actuator. Referring again to FIG. 4, Detail D, where OIS motion is moderate, the lens/sensor can be kept always close to neutral position thus reducing power consumption. In some use cases, then, lens/sensor between-frame slew strategy for power optimization may be similar to a strategy optimized for railing prevention.

However, in some implementations, a preferred neutral position may be selected based on power minimization considerations may be different from a preferred neutral position selected only to prevent railing. For railing prevention, a maximum compensation range (margin) may be achieved with an average lens/sensor position approximately at geometric center (neutral position). For power minimization, an average lens/sensor position may advantageously be chosen at the location where gravity, in combination with lens supporting springs, would pull it with OIS completely de-activated. This in turn will depend on camera orientation (e.g., whether the camera is operating landscape or portrait mode).

Figure 6:
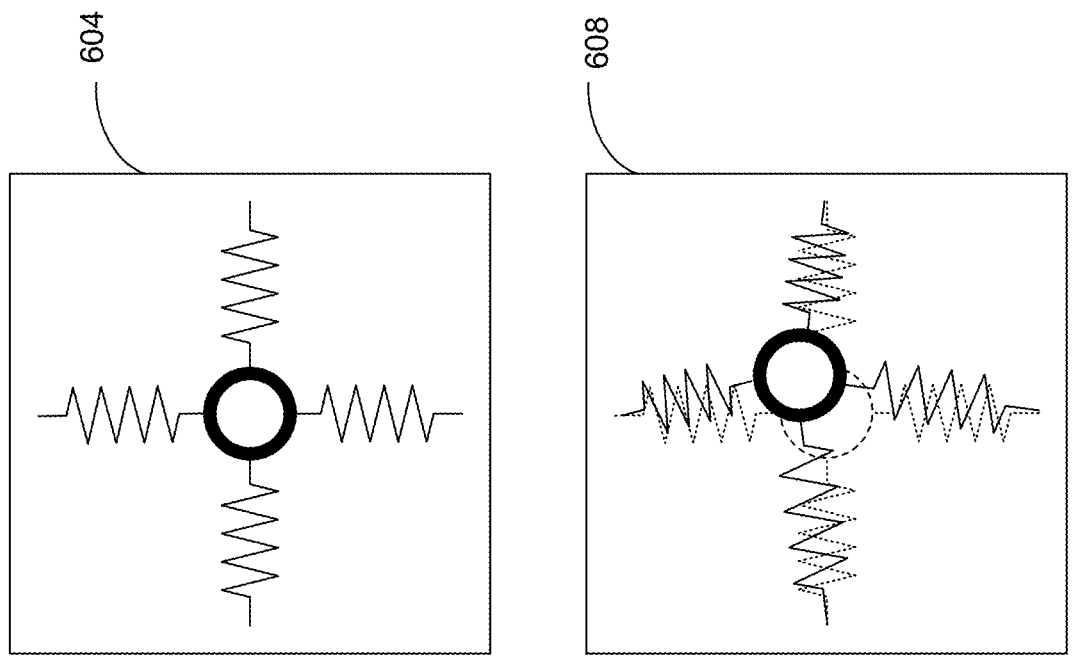
FIG. 6 illustrates an example of a camera lens arrangement of a camera equipped with OIS, according to some implementation.
Figure 6:
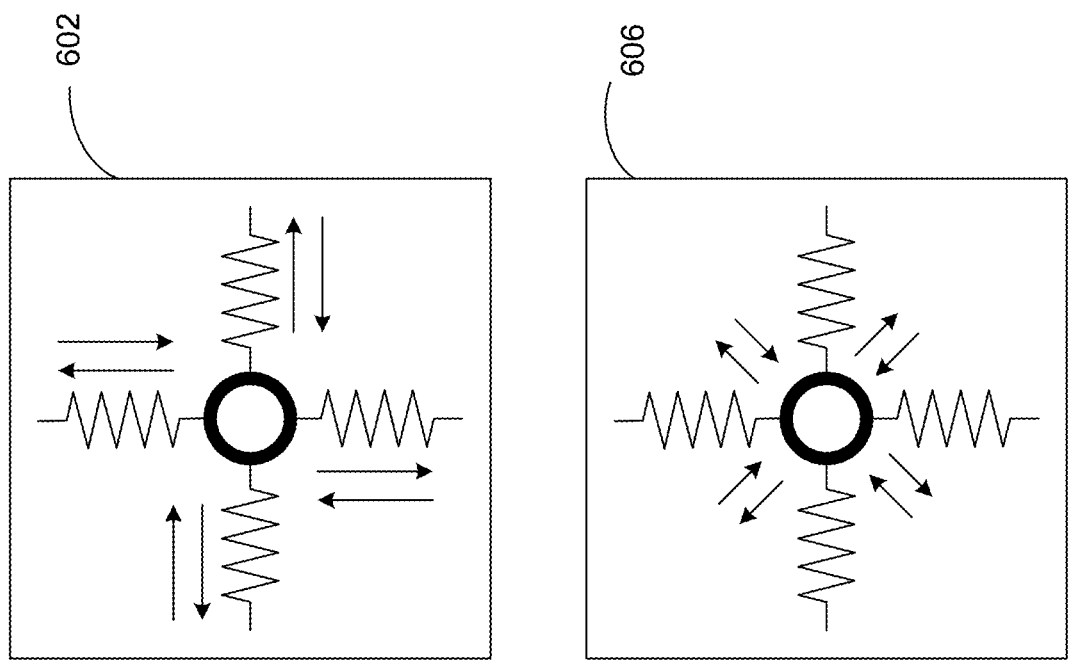

FIG. 6 illustrates an example of a camera lens arrangement of a camera equipped with OIS, according to some implementations. The camera lens arrangement includes a lens suspended with one or more springs and/or magnet. When the camera is powered down, block 602, the lens position may be passively floating. However when the camera is powered up (initialized), it may be necessary to actively maintain position control of the lens in a known, stable, position even when OIS is off, block 604 (e.g., in a preview mode or in some video modes). A common OIS design includes a spring lens suspension, as illustrated in FIG. 6, configured as a VCM actuator which is configured to move the lens s required by using VCM Lorentz force. VCM current draw will be generally proportional to magnitude of the lens shift from a neutral position. In an idealized model of an actual arrangement, the centered lens (OIS off) should not require any current whatsoever, with the springs mechanically trimmed to naturally keep the lens in the neutral central position. However, because, for example camera image acquisition may be may be performed various camera orientations, gravity pull on the lens may vary. In cases where the neutral (zero power) lens position is optimized for a level (face up) camera, as would be typical in the absence of the present teachings, maintaining a neutral lens position when the camera is in portrait or landscape orientation requires a current, sometimes substantial. As a result, an OIS control loop may be required to keep the lens centered and prevent its bouncing due to camera motion, at a power cost on the order of 20-100 milliamps simply to counter effects of gravity, whether or not the OIS is off, block 604 or the OIS is on, block 606.

In an implementation, the OIS-off lens neutral position is selected to be where the spring force will balance the gravity force, and not, necessarily, in the mechanical center. Such a gravity-adjusted neutral position, while ordinarily fairly close to the mechanical center, will be thus different in portrait and landscape mode. Rather than the OIS controller resisting the gravity force, the disclosed techniques contemplate letting gravity displace the lens. The OIS controller then may be configured to only apply a small stabilization force (current) to minimize lens mechanical tremor in that position. While the phone is kept in particular portrait or landscape position, a DC current component of power required to maintain position will be nearly eliminated, with only small AC current required for dynamic stabilization against camera vibrations or tremor.

Referring still to FIG. 6, when OIS is switched on, block 606, the processor may be configured to reduce railing and power consumption simultaneously. For example, in some implementations, the processor may be configured to locate the lens/sensor, symmetrically with respect to the gravity neutral position. In conditions of relatively mild motion and with short frame interval (fast fps, as illustrated in FIG. 4, Detail D), power consumption and incidents of railing may both be minimized. In other use case conditions (FIG. 4, Detail C, for example) in order to avoid railing, some increase in power consumption may be justified. Referring again to FIG. 6, when OIS is in a "manual control" mode, block 608, a user or host processor may select a mode that prioritizes power saving over railing prevention or vice versa.

In some implementations, the gravity-adjusted neutral position may be determined by one or more calibration processes. Assuming repeatable spring parameters on each phone of a given model, the calibration may be done just once on a pilot phone in factory. Alternatively, calibration may be performed on each phone, prior to delivery to a user ("factory calibration"), or (preferably, in a "background operation") after delivery to the user.

In an implementation, factory calibration in the portrait and landscape orientations may be performed by, in each orientation position, sending synthetic control signal to move lens up-down and measure either the VCM current or the on-battery current to find the optimal position with the minimum current.

In some implementations, a background calibration may be performed by (1) centering the lens and capturing an image; (2) letting the lens drop to a neutral position for a given phone orientation by disabling the VCM/Hall servo loop, and capturing an image; and (3) measuring the vertical shift of key points between the two acquired images, convert to degrees then into the VCM displacement. The VCM displacement will correspond to the minimum power lens offset from the geometric center.

While, in typical usage, most images will be captured in either landscape or portrait mode, a camera may be held at other angles during a shooting session. It may be advantageous to use an accelerometer to determine the camera's pose finer than just selecting between landscape and portrait. To the extent that the springs in the X and Y directions are linear (which is very likely true) a resting position of the lens given the angle of the phone with respect to gravity may be directly ascertained. The gravity vector is easily determined from the accelerometer. If the phone is held stable at an intermediate angle, the center of the lens could be moved to the lowest power position depending on the angle of the phone with respect to gravity, not just for landscape and portrait positions.

Figure 7:
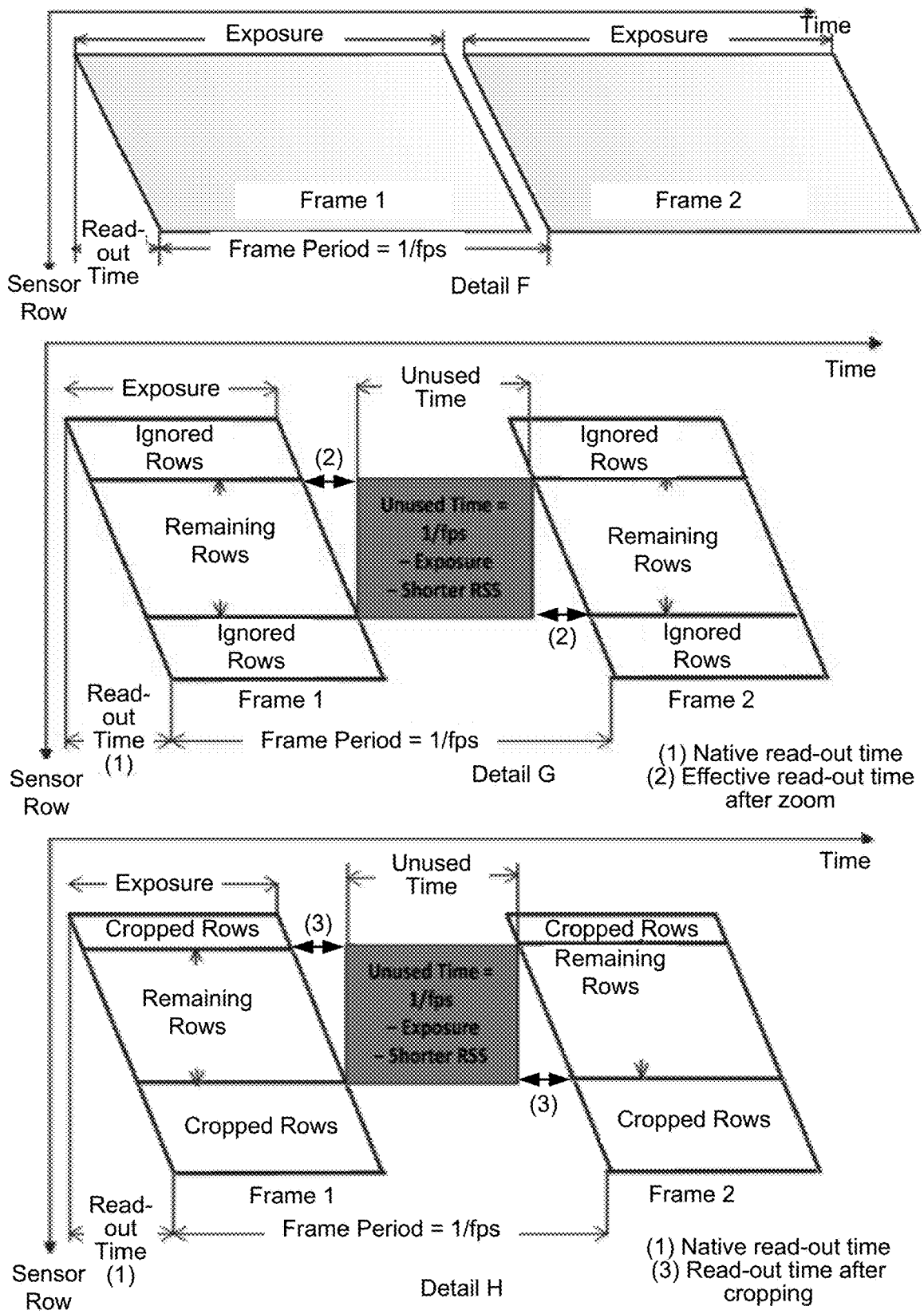
FIG. 7 illustrates OIS operation as a function of time, according to some implementations.

As indicated hereinabove, in connection with FIGS. 3-5, in some use case scenarios, there will be adequate time (e.g. 5-10 ms) to relocate the lens or image sensor between the completion of data acquisition of one image frame and start of data acquisition for an immediately succeeding image frame. In some use cases, however, insufficient time may be available, in the absence of some further mitigating steps that will now be described. FIG. 7 illustrates OIS operation as a function of time, according to some implementations. Referring first to Detail F, it may be observed that in the illustrated rolling shutter mode of operation, there is no time available between frames to relocate the lens or image sensor. Details G and H illustrate two techniques for mitigating this problem. Referring first to Detail G, in a "digital zoom" mode (in which good OIS performance may be particularly important), the effective readout time will be reduced as a result of some of the sensor rows being ignored (not read or discarded in post processing). The shorter effective readout time (which may be characterized as Effective Readout Time=Native Readout Time/Zoom, zoom being 1 for a non-zoomed image) may yield a sufficient "unused time" in which to execute a relocation of the lens/sensor between frames.

Alternatively, or in addition, video cropping may further some top and bottom rows too, for example about 20% of total image, as illustrated in Detail H. The effective readout time may be reduced similarly to that digital zoom, but the image rows (as well as columns) may be removed in unequal proportion. Where zoom and video cropping are both performed, the effective readout time may be characterized as Effective Readout Time=Native Readout Time/Zoom*(1.0−Cropping Margin).

Reducing the effective readout time, whether by video zoom or cropping, is desirable because synchronous OIS is most advantageously performed when the sum of exposure time, effective readout time and lens/sensor relocation time (including settling time) is less than the frame period. In some implementations, one or more of the exposure time, the lens/sensor relocation time and the frame period are adjusted to enhance synchronous OIS performance, as will now be described. In yet other implementations, the sum of exposure time, effective readout time and lens/sensor relocation time (including settling time) may exceed the frame period, but techniques are implemented whereby observable image quality degradation is minimized.

Figure 8:
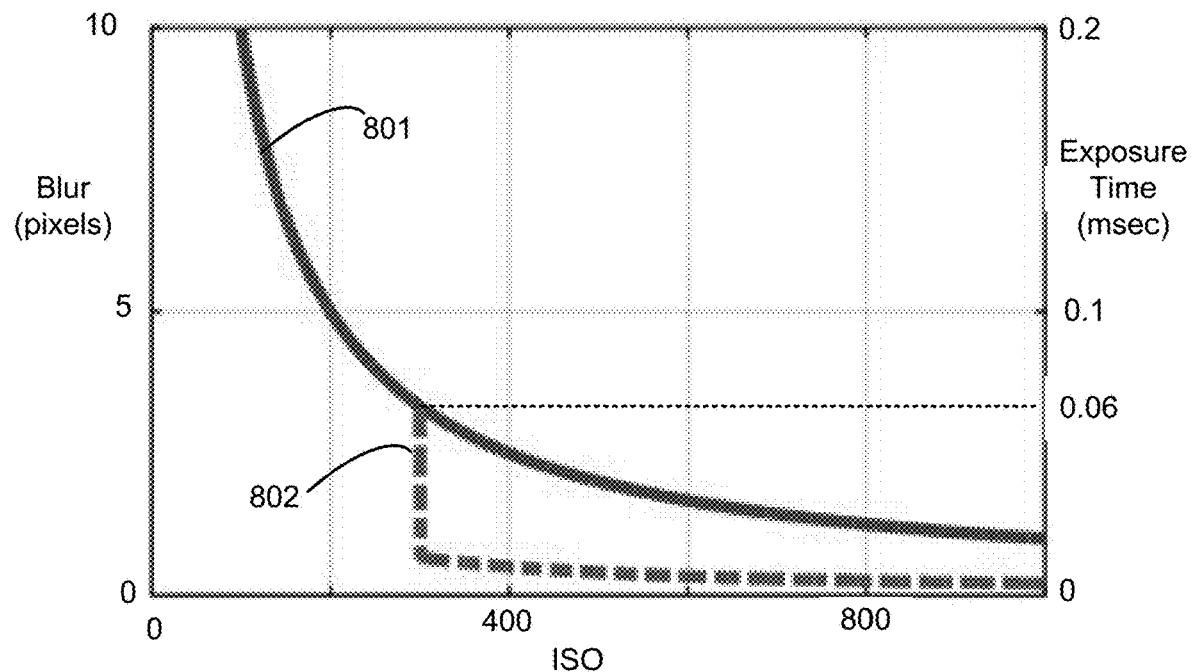
FIG. 8 illustrates an example plot of image blur as a function of light sensitivity (ISO) and exposure time.
Figure 9:
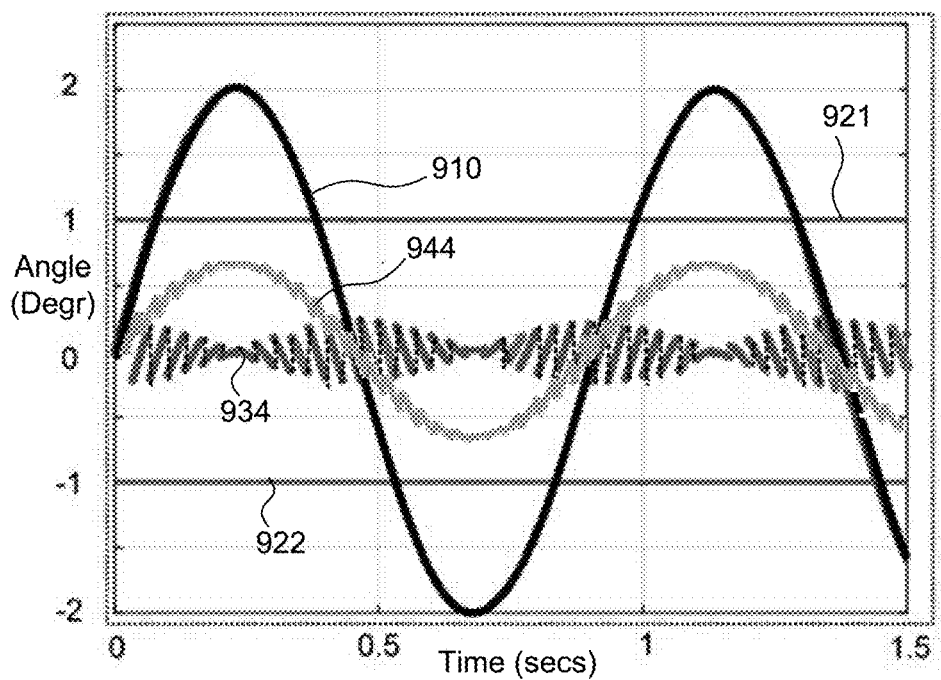
FIG. 9 illustrates an example of modelled OIS operation as a function of time, according to some implementations.

First, exposure time, in some implementations, may be reduced. Although an important aspect of OIS is reducing blur for long exposure times, a more optimum image quality may sometimes be obtained by reducing exposure times in order to enable synchronous OIS. FIG. 8 illustrates an example plot of image blur as a function of light sensitivity (ISO) and exposure time. Plot 801 illustrates how, in the absence of OIS (whether because OIS is disabled, or the lens/sensor is railed), image blur (scale left) varies with ISO and exposure time (scale right). In the illustrated example, it is assumed that synchronous OIS cannot be performed unless exposure time is less than about 0.06 msec. When exposure time is reduced below 0.06 msec, however, a significant improvement in image blur for the same ISO value may be achieved. As shown by plot 802, at an ISO of about 300, enabling synchronous OIS reduces blur from about 3 pixels to less than one pixel. Accordingly, in some implementations, synchronous OIS feasibility, and image quality, is increased by rebalancing auto exposure parameters of exposure vs ISO Second, lens/sensor relocation time, in some implementations, may be reduced. For example, in use cases in which camera motion is limited (e.g., in some implementations, the motion is not greater in magnitude than twice the OIS actuator range) the lens/sensor may be relocated between frames a distance less than might otherwise be selected on the basis solely of minimizing risk of railing and/or power consumption. FIG. 9 illustrates an example of modelled OIS operation as a function of time, according to some implementations. Similarly to Detail D of FIG. 4, plot 910 in FIG. 9 shows an example of a modeled or simulated angular motion of a camera with respect to time. Limit lines 921 and 922 denote, respectively, an upper and lower range of motion limit assumed for the camera's OIS actuator and/or sensor. Plot 934 presents OIS angle as a function of time, optimized for reducing risk of railing and/or power consumption. Plot 944 represents an alternative strategy that provides for shorter relocation times, while still preventing OIS railing. Because the lens/sensor slew distance is smaller than in plot 934, relocation time as well as ringing amplitude is reduced and faster settling can be expected. Stress on actuator hardware may also be reduced; however, the strategy of plot 944 can be expected to require more power than that of plot 934.

Third, an effective frame period may be increased, in some implementations. For example, when the camera is in a "Still Shot Preview" mode, there may not be a strict frame per second requirement. In some implementations, the frame rate may be lowered in when the camera is in still shot preview mode to ensure unused timeout between frames, sufficient for relocation of the lens/sensor. As a further example, situations may occur when the camera is in video mode, at a frame rate and operating conditions where the sum of exposure time, effective readout time and lens/sensor relocation time (including settling time) is not less than the frame period. In some implementations, these situations are accommodated by performing synchronous OIS during every second frame (odd or even frames), effectively downconverting from a native frame rate (e.g., 60 fps) to a downconverted frame rate of 30 fps. The unused frames are discarded, and the resulting frame sequence may be digitally upconverted back to the native frame rate.

Figure 10:
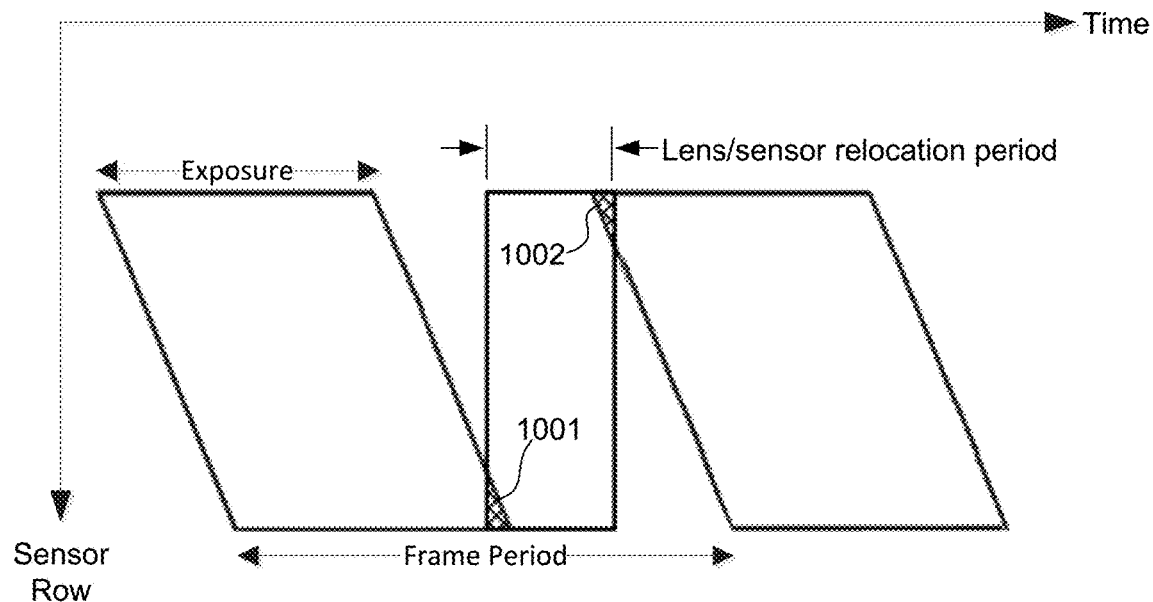
FIG. 10 illustrates OIS operation as a function of time, according to some further implementations.

Finally, in some use cases, the sum of exposure time, effective readout time and lens/sensor relocation time (including settling time) may exceed the frame period, but synchronous OIS techniques are adapted to minimize observable image quality degradation. FIG. 10 illustrates OIS operation as a function of time, according to some further implementations. In the illustrated example, lens/sensor relocation time exceeds the time available between successive frames. Synchronous OIS may still be performed during a time interval that partially overlaps (in the illustrated example) the end of a first successive frame and the beginning of a second successive frame. As represented by the cross-hatched regions 1001, and 1002, there will exist some rows during which the lens/sensor is being relocated. The image quality of those rows will be adversely effected, but these rows may represent a small fraction of the total image, which, quality of which will be improved by the OIS techniques.

Figure 11:
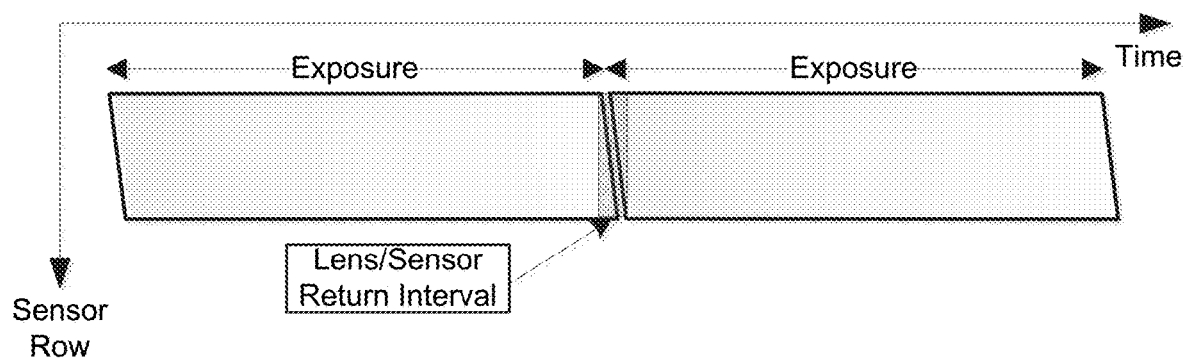
FIG. 11 illustrates OIS operation as a function of time, according to a yet further implementations.

FIG. 11 illustrates OIS operation as a function of time, according to a yet further implementations. In the illustrated example, where exposure time is long relative to the lens/sensor relocation time, synchronous OIS may be carried out for most of the exposure period, with a small percentage of that time (at the beginning and/or end of frame) used for lens/sensor relocation. During lens/sensor relocation, some blurring will be experienced, but, because the relocation duration constitutes only a small percentage of the entire exposure, a resulting degradation in image will not totally offset the benefit obtained by performing synchronous OIS.

In certain use cases, the OIS may ordinarily be disabled (e.g., when the camera is tripod mounted or is operating an electronic image stabilization (EIS) process that is incompatible with a mechanical OIS. The presently disclosed techniques may nevertheless have application to some of these use cases.

First, whether or not OIS is disabled, power saving aspects of the present disclosure may be implemented. More particularly, as described hereinabove, the OIS-off lens neutral position may still be selected to be where the spring force will balance the gravity force, and not, necessarily, in the mechanical center. Such a gravity-adjusted neutral position will be thus different in portrait and landscape mode, and close to the mechanical center for the level phone. While the phone is kept in particular portrait or landscape position, a DC current component of power required to maintain position will be nearly eliminated.

Second, a controller may be configured to cause an image stabilizing arrangement to shift one or both of the camera lens and the image sensor so as to compensate for certain motions unrelated to camera unsteadiness or jitter. An example use case may be astronomical photography with a tripod-mounted camera. Instead or in addition to moving the camera to follow a precomputed position of a planet, satellite or other astronomical object during a very long exposure, the controller may be configured to relocate the lens/sensor along a corresponding track within the OIS range of motion. On each successive new frame the imaged astronomical object will be in a different position, but always in sharp focus. A further example use case may relate to following a tracked moving target. Where near real time knowledge of a target's azimuth angle with respect to the camera is available, the controller may be configured to relocate the lens/sensor along a corresponding track within the OIS range of motion. Where a target's range is likewise known, imaging of the target may be performed with continuously adjusted focus and little or no blurring.

Finally, in some use cases relying primarily on EIS, aspects of the present disclosure may improve the performance of the EIS system. For example, in the context of EIS for video imaging, the EIS may have a 6-7 degree peak-to-peak range over which apparent image stabilization can be achieved by selectively cropping succeeding frames of a video sequence of frames. A larger oscillation (due, for example to the camera operator's motion while walking or running) may result in image jumpiness. In some implementations, this problem may be mitigated by configuring the OIS controller, in response to inputs from an EIS camera position estimator, to relocate the lens/sensor between frames. Based on the inputs from the EIS camera position estimator, an average lens/sensor position on the upcoming frame may be selected. When, for example the camera is moving up, the lens/sensor average position should move down, effectively reducing image bouncing, hence expanding the effective range over which EIS cropping may be carried out. In some implementations, a desired target lens/sensor position (controlled through the lens/sensor jump size and direction between adjoining frames) may be communicated before each frame from the EIS to the OIS controller. Alternatively or in addition improving the EIS cropping margin, asymmetry of cropped top/bottom rows may be addressed by adjusting the lens/sensor relocation time. For example, when bottom rows are cropped as shown in Detail H of FIG. 7, the lens/sensor may advantageously start relocation a few msec before end of frame. This may result in some broken rows at the end (bottom) of a frame, but these rows are, anyway expected to be discarded. Beneficially, an earlier lens/sensor settling time helps ensure that the top rows of the next frame will be undisturbed. This adjustment may be made based on a cropping status input received from the EIS.

Figure 12:
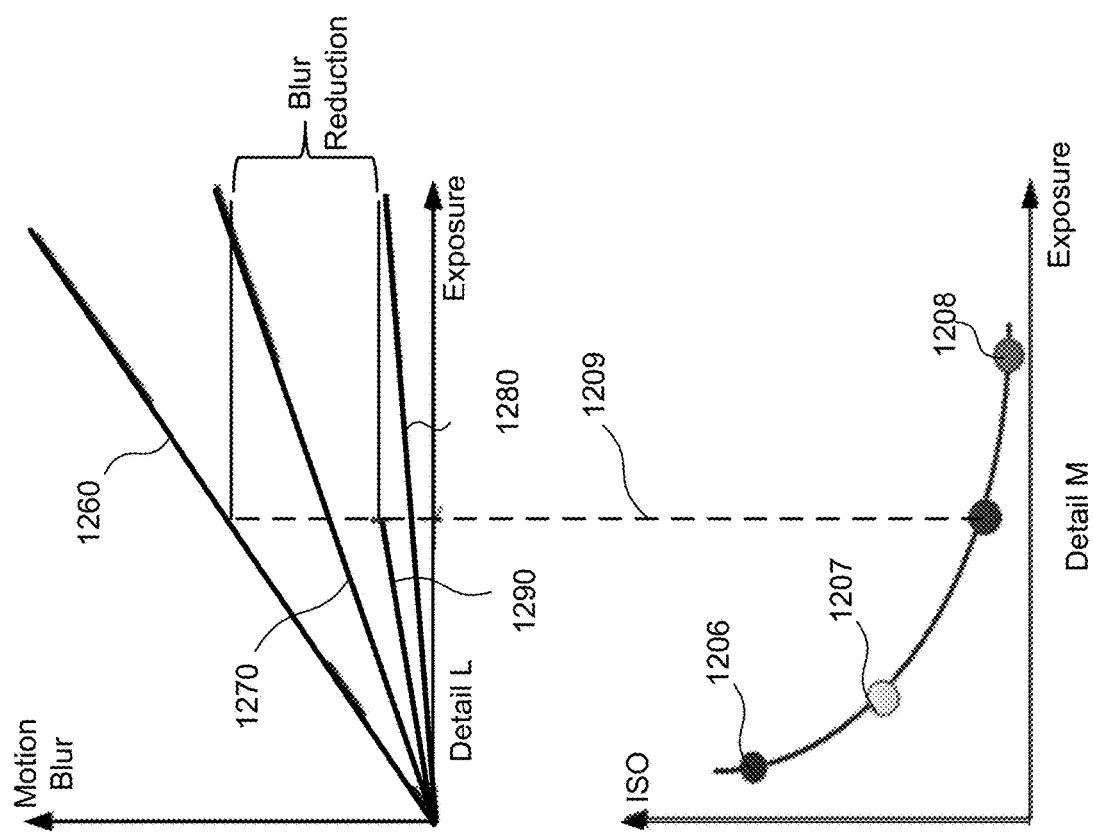
FIG. 12 illustrates an example of auto exposure performance improvement according to some implementations.
Figure 12:
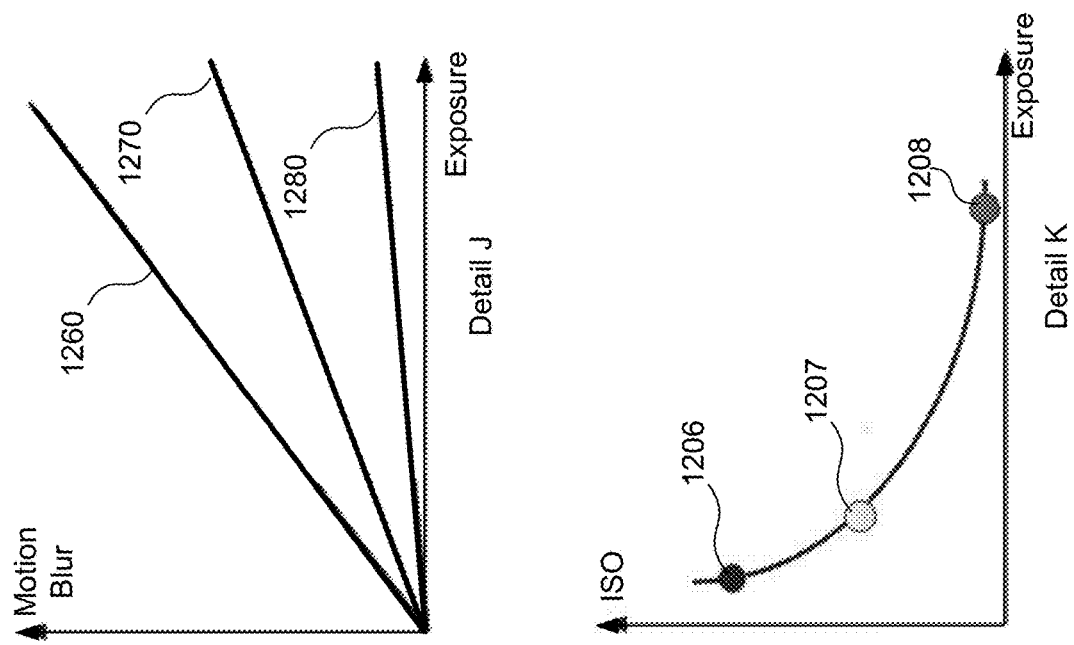

As indicated in connection with FIG. 8 hereinabove, in some use cases image quality may be increased by rebalancing auto exposure parameters of exposure vs ISO. FIG. 10 illustrates an example of auto exposure performance improvement according to some implementations. In FIG. 12, Details J and L present motion blur as a function of exposure time, whereas Details K and M present auto exposure settings of ISO vs Exposure time, for a given optimal luminosity value. Referring now to Detail J, plots 1260, 1270 and 1280 relate to motion blur vs exposure for, respectively, fast motion where OIS is disabled or inoperative, moderate motion with OIS disabled, and moderate motion with IOS operating. Referring to Detail K, for each of the three motion conditions 1260, 1270 and 1280, the auto exposure function may find an optimum setting of ISO vs exposure time, respectively, points 1206, 1207 and 1208. Referring now to Details L and M, the present inventors have appreciated that, where synchronous OIS is available, motion blur due to fast motion can be substantially reduced (plot 1290). As indicated above, synchronous OIS is generally feasible only when the sum of exposure time, effective readout time and lens/sensor relocation time (including settling time) is less than the frame period. Accordingly, in some implementations an auto exposure algorithm is altered to prevent selecting an exposure duration greater than a critical value 1209, so as to ensure the availability of synchronous OIS.

Figure 13:
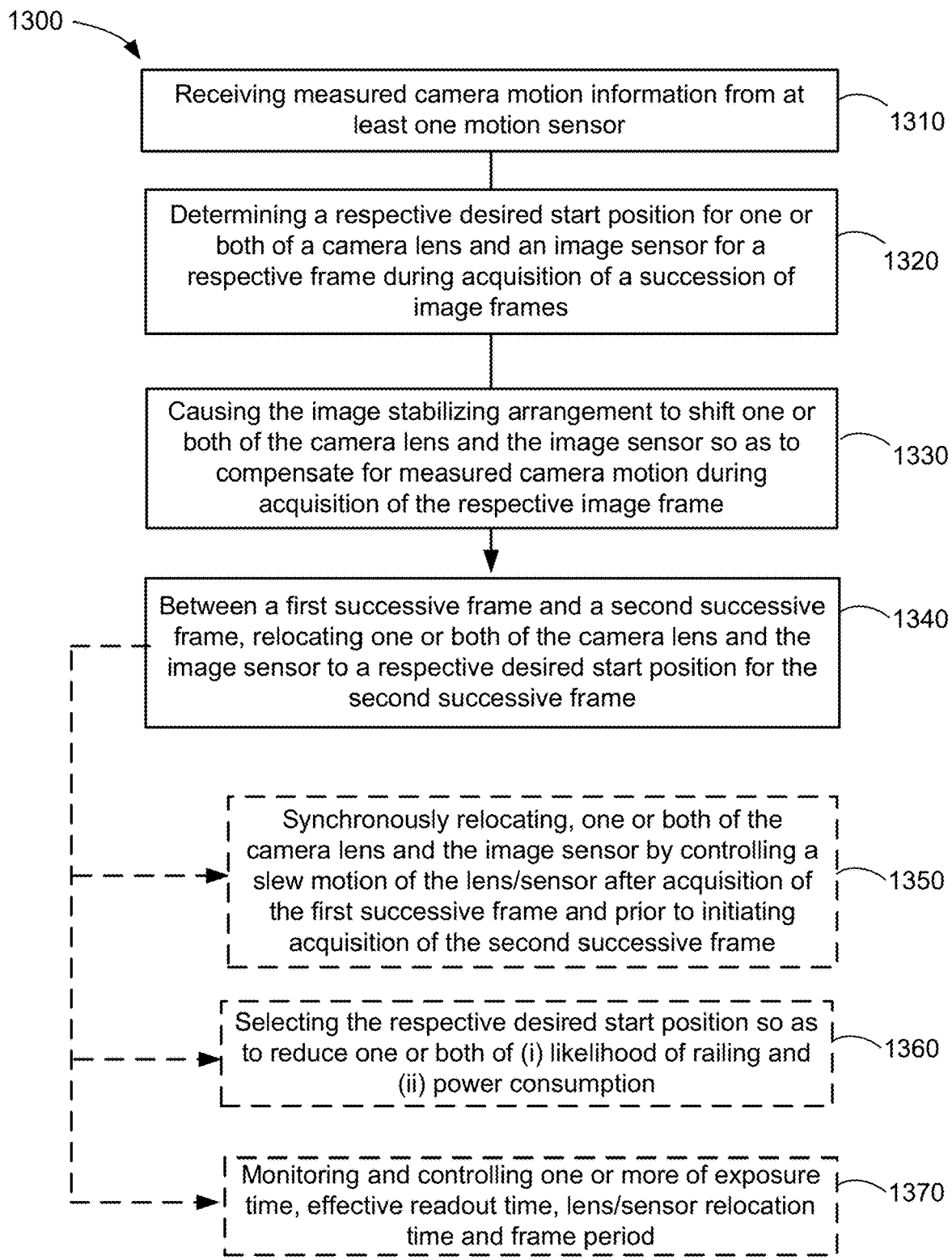
FIG. 13 illustrates an example of a process flow for optical image stabilization in a camera system, according to an implementation.

FIG. 13 illustrates an example of a process flow for optical image stabilization in a camera system, according to some implementations. As described hereinabove, an OIS apparatus may include a lens of the camera system, an actuator mechanically coupled with the lens, an image sensor optically coupled with the camera lens and a controller. The controller may be communicatively coupled with the image stabilizing arrangement and at least one motion sensor for measuring camera motion, wherein the controller. The method 1300 includes a block 1310 of receiving, at the controller, measured camera motion information from at least one motion sensor.

At block 1320, during acquisition of a succession of image frames, the controller may determine a respective desired start position, for one or both of the camera lens and the image sensor, for a respective image frame.

At block 1330, during acquisition of the respective image frame, the controller may cause the image stabilizing arrangement to shift one or both of the camera lens and the image sensor so as to compensate for the measured camera motion.

At block 1340, between a first successive frame and a second successive frame, the controller may cause the image stabilizing arrangement to relocate one or both of the camera lens and the image sensor to a respective desired start position for the second successive frame.

Optionally, one or more of the following processes may be executed. At block 1350, the controller may synchronously relocate one or both of the camera lens and the image sensor by controlling a slew motion of the camera lens or image sensor after acquisition of the first successive frame and prior to initiating acquisition of the second successive frame. At block 1360, the controller may select the respective desired start position so as to reduce one or both of (i) likelihood of railing and (ii) power consumption. At block 1370, the controller may monitor and control one or more of exposure time, effective readout time, lens/sensor relocation time and frame period.

Figure 14:
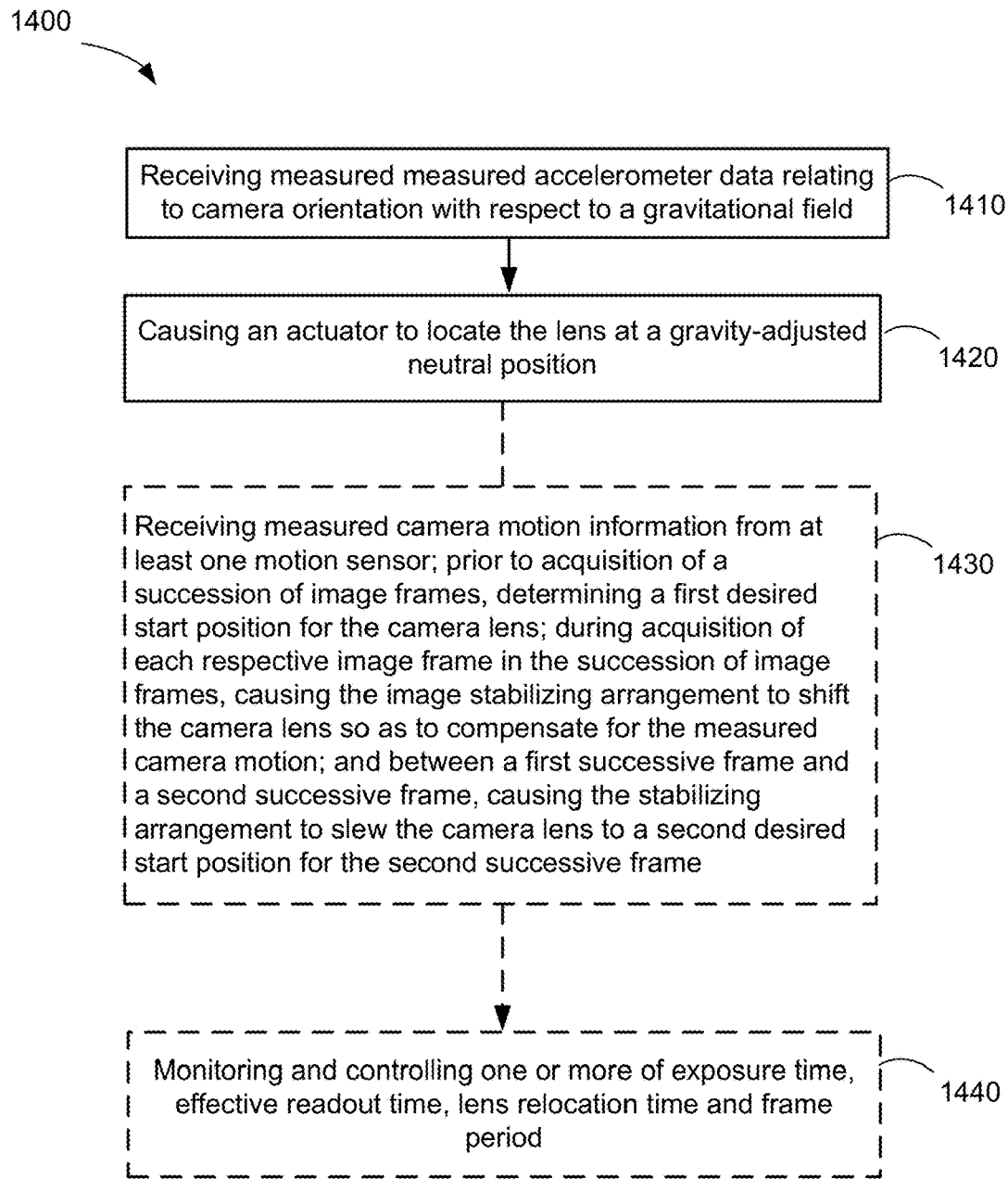
FIG. 14 illustrates an example of a process flow for optical image stabilization in a camera system, according to another implementation.

FIG. 14 illustrates an example of a process flow for optical image stabilization in a camera system, according to another implementation. The method 1400 includes a block 1410 of receiving, at the controller, measured accelerometer data relating to camera orientation with respect to a gravitational field. The method may conclude, at block 1420, with causing the actuator to locate the lens at a gravity-adjusted neutral position, based on the accelerometer data.

Optionally, one or both of the following processes may be executed. At block 1430, the controller may receive measured camera motion information from at least one motion sensor. Prior to acquisition of a succession of image frames, the controller may determine a first desired start position for the camera lens. During acquisition of each respective image frame in the succession of image frames, the controller may cause the image stabilizing arrangement to shift the camera lens so as to compensate for the measured camera motion. Between a first successive frame and a second successive frame, the controller may cause the stabilizing arrangement to slew the camera lens to a second desired start position for the second successive frame. At block 1440, the controller may monitor and control one or more of exposure time, effective readout time, lens relocation time and frame period.

Figure 15:
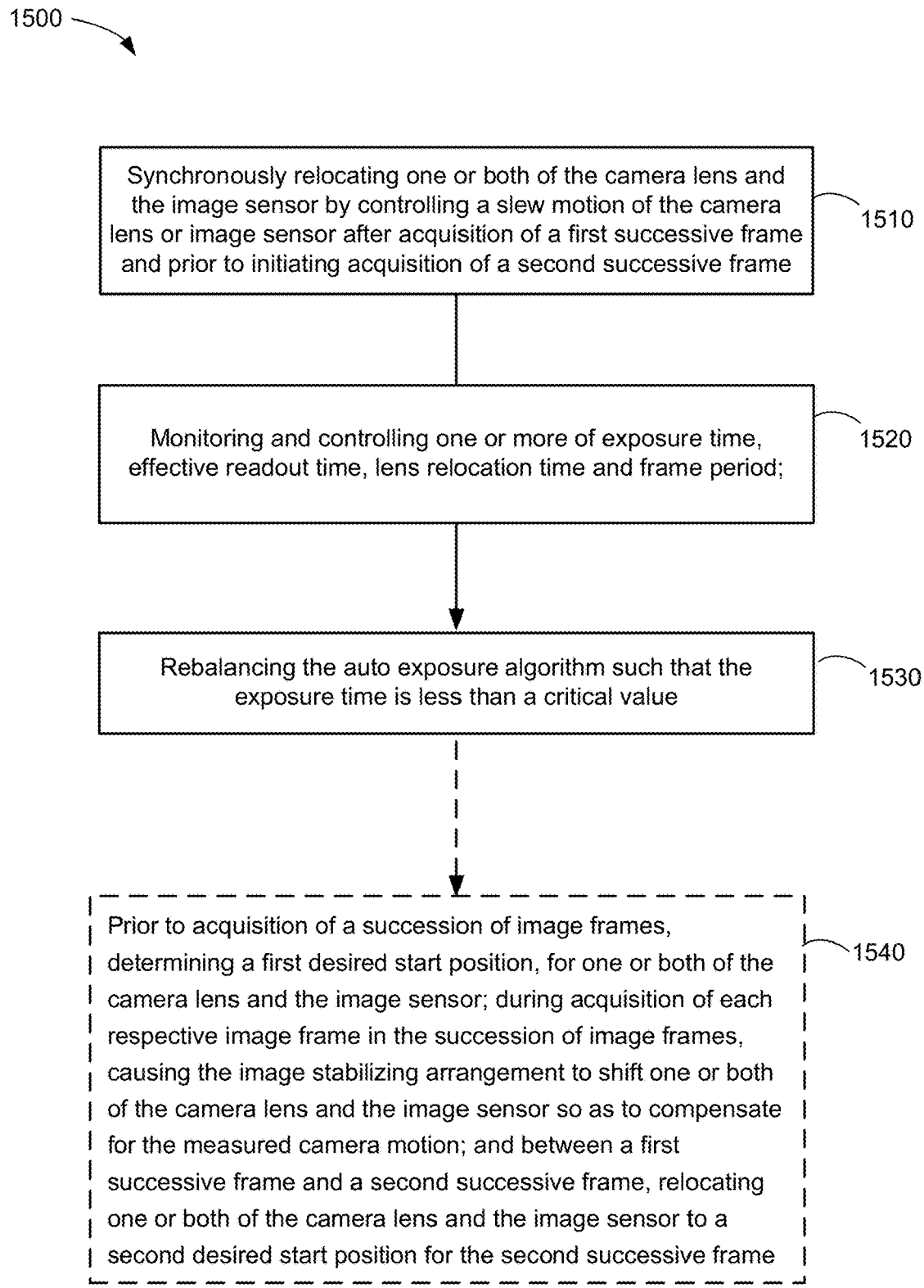
FIG. 15 illustrates an example of a process flow for optical image stabilization in a camera system, according to a yet further implementation.

FIG. 15 illustrates an example of a process flow for optical image stabilization in a camera system, according to a yet further implementation. The method 1500 includes a block 1510 of synchronously relocating, with the controller, one or both of the camera lens and the image sensor by controlling a slew motion of the camera lens or image sensor after acquisition of a first successive frame and prior to initiating acquisition of a second successive frame, the controller being communicatively coupled with the image stabilizing arrangement and at least one motion sensor for measuring camera motion.

At block 1520, the controller may monitoring and control one or more of exposure time, effective readout time, lens relocation time and frame period. At block 1530, the controller may rebalance the auto exposure algorithm such that the exposure time is less than a critical value.

Optionally, the method may continue, at block 1540, with the controller, prior to acquisition of a succession of image frames, determining a first desired start position, for one or both of the camera lens and the image sensor; during acquisition of each respective image frame in the succession of image frames, causing the image stabilizing arrangement to shift one or both of the camera lens and the image sensor so as to compensate for the measured camera motion; and between a first successive frame and a second successive frame, relocating one or both of the camera lens and the image sensor to a second desired start position for the second successive frame.

Thus, techniques for synchronous optical image stabilization have been disclosed. It will be appreciated that a number of alternative configurations and operating techniques may be contemplated.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor or any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by or to control the operation of data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

What is claimed is:

1. An apparatus for optical image stabilization (OIS) of a camera system, the apparatus comprising:
    a lens of the camera system;
    an image stabilizing arrangement, the arrangement including one or both of an image sensor optically coupled with the camera lens and an actuator mechanically coupled with the one or both of the lens and the image sensor; and
    a controller, the controller communicatively coupled with the image stabilizing arrangement and at least one motion sensor for measuring camera motion, wherein the controller is configured to:
        receive measured camera motion information from the at least one motion sensor;
        prior to acquisition of a succession of image frames, determine a first desired start position, for one or both of the camera lens and the image sensor;
        during acquisition of each respective image frame in the succession of image frames, cause the image stabilizing arrangement to shift or rotate one or both of the camera lens and the image sensor so as to compensate for the measured camera motion; and
        during a time interval that falls at least partially between a first successive frame and a second successive frame, relocate one or both of the camera lens and the image sensor to a second desired start position for the second successive frame, wherein the second desired start position is disposed, with respect to a geometrically neutral position and with respect to an end position reached at completion of an immediately preceding frame, such that the geometrically neutral position is approximately midway between the second desired start position and the end position, wherein the geometrically neutral position is a centered position.

2. The apparatus of claim 1, wherein the controller is configured to synchronously relocate, during at least a portion of the time interval, one or both of the camera lens and the image sensor by controlling a slew motion of the camera lens or image sensor.

3. The apparatus of claim 1, wherein the controller is configured to select at least one of the first and second respective desired start position so as to reduce one or both of (i) likelihood of railing and (ii) power consumption.

4. The apparatus of claim 1, wherein the time interval falls entirely between the first successive frame and the second successive frame.

5. The apparatus of claim 1, wherein the time interval at least partially overlaps one or both of the first successive frame and the second successive frame.

6. The apparatus of claim 1, wherein the camera motion information includes one or both of rotation and translation.

7. The apparatus of claim 1, wherein the controller is configured to drive the actuator to relocate the lens.

8. The apparatus of claim 1, wherein the motion sensor includes one or more of a gyroscope, an accelerometer or other motion sensor.

9. A method for optical image stabilization (OIS) of a camera system, the method comprising:

receiving, at a controller, measured camera motion information from at least one motion sensor;

during acquisition of a succession of image frames, determining, with the controller, a respective desired start position, for one or both of a camera lens and an image sensor, for a respective image frame;

during acquisition of the respective image frame, causing the image stabilizing arrangement to shift, under direction of the controller, one or both of the camera lens and the image sensor so as to compensate for the measured camera motion; and during a time interval that falls at least partially between a first successive frame and a second successive frame, relocating, under direction of the controller, one or both of the camera lens and the image sensor to a respective desired start position for the second successive frame, wherein the second desired start position is disposed, with respect to a geometrically neutral position and with respect to an end position reached at completion of an immediately preceding frame, such that the geometrically neutral position is approximately midway between the second desired start position and the end position, wherein the geometrically neutral position is a centered position.

10. The method of claim 9, further comprising synchronously relocating, under direction of the controller, during at least a portion of the time interval, one or both of the camera lens and the image sensor by controlling a slew motion of the camera lens or image sensor.

11. The method of claim 9, further comprising selecting, with the controller, the respective desired start position so as to reduce one or both of (i) likelihood of railing and (ii) power consumption.

12. The apparatus of claim 9, wherein the time interval falls entirely between the first successive frame and the second successive frame.

13. The apparatus of claim 9, wherein the time interval at least partially overlaps one or both of the first successive frame and the second successive frame.

14. The method of claim 9, wherein the camera motion information includes one or both of rotation and translation.

15. The method of claim 9, wherein relocating the camera lens includes driving an actuator with the controller.

16. The method of claim 9, further comprising monitoring and controlling, with the controller, one or more of exposure time, effective readout time, lens/sensor relocation time and frame period.

17. The method of claim 16, wherein controlling one or more of the exposure time, the effective readout time, the lens/sensor relocation time and the frame period includes causing a sum of the exposure time, the effective readout time and the lens/sensor relocation time to be less than the frame period.

18. A non-transitory computer readable medium storing program code to be executed by a controller, the program code comprising instructions configured to cause the controller to:

receive measured camera motion information from at least one motion sensor;

during acquisition of a succession of image frames, determine a respective desired start position, for one or both of a camera lens and an image sensor, for a respective image frame;

during acquisition of the respective image frame, cause the image stabilizing arrangement to shift one or both of the camera lens and the image sensor so as to compensate for the measured camera motion; and during a time interval that falls at least partially between a first successive frame and a second successive frame, cause the image stabilizing arrangement to relocate one or both of the camera lens and the image sensor to a respective desired start position for the second successive frame, wherein the second desired start position is disposed, with respect to a geometrically neutral position and with respect to an end position reached at completion of an immediately preceding frame, such that the geometrically neutral position is approximately midway between the second desired start position and the end position, wherein the geometrically neutral position is a centered position.

19. The computer readable medium of claim 18, further comprising instructions configured to cause the controller, during at least a portion of the time interval, to synchronously relocate one or both of the camera lens and the image sensor by controlling a slew motion of the camera lens or image sensor.

20. The computer readable medium of claim 18, further comprising instructions configured to cause the controller to select the respective desired start position so as to reduce one or both of (i) likelihood of railing and (ii) power consumption.

21. The computer readable medium of claim 18, further comprising instructions configured to cause the controller to monitor and control one or more of exposure time, effective readout time, lens/sensor relocation time and frame period.

22. The computer readable medium of claim 21, wherein controlling one or more of the exposure time, the effective readout time, the lens/sensor relocation time and the frame period includes causing a sum of the exposure time, the effective readout time and the lens/sensor relocation time to be less than the frame period.

23. An apparatus for optical image stabilization (OIS) of a camera system, the apparatus comprising:

a lens of the camera system;

an image stabilizing arrangement, including one or both of:
an image sensor optically coupled with the camera lens, means for shifting or rotating one or both of the lens and the image sensor; and a controller, the controller communicatively coupled with the image stabilizing arrangement and at least one motion sensor for measuring camera motion, wherein the controller is configured to:

receive measured camera motion information from the at least one motion sensor;

prior to acquisition of a succession of image frames, determine a first desired start position, for one or both of the camera lens and the image sensor;

during acquisition of each respective image frame in the succession of image frames, cause the image stabilizing arrangement to shift or rotate one or both of the camera lens and the image sensor so as to compensate for the measured camera motion; and during a time interval that falls at least partially between a first successive frame and a second successive frame, relocate one or both of the camera lens and the image sensor to a second desired start position for the second successive frame, wherein the second desired start position is disposed, with respect to a geometrically neutral position and with respect to an end position reached at completion of an immediately preceding frame, such that the geometrically neutral position is approximately midway between the second desired start position and the end position, wherein the geometrically neutral position is a centered position.

24. The apparatus of claim 23, wherein the controller is configured to synchronously relocate, during at least a portion of the time interval, one or both of the camera lens and the image sensor by controlling a slew motion of the camera lens or image sensor.

25. The apparatus of claim 23, wherein the controller is configured to select at least one of the first and second respective desired start position so as to reduce one or both of (i) likelihood of railing and (ii) power consumption.

26. The apparatus of claim 23, wherein the time interval falls entirely between the first successive frame and the second successive frame.

27. The apparatus of claim 23, wherein the time interval at least partially overlaps one or both of the first successive frame and the second successive frame.

* * * * *